Oct. 20, 1942.　　F. W. THOMAS　　2,299,418
SCOOP
Filed July 22, 1940

INVENTOR.
Frank W. Thomas
BY *Hull, West & Chilton*
ATTORNEYS.

Patented Oct. 20, 1942

2,299,418

UNITED STATES PATENT OFFICE 2,299,418

SCOOP

Frank W. Thomas, East Cleveland, Ohio

Application July 22, 1940, Serial No. 346,703

1 Claim. (Cl. 294—55)

This invention relates to tools, and more particularly to a tool for removing debris from gutters attached to the eaves of buildings prior to painting the gutters. It has for its general object to provide a tool of this character which is inexpensive of production, and which is capable of being operated efficiently for the purpose for which it is designed.

Figure 1:
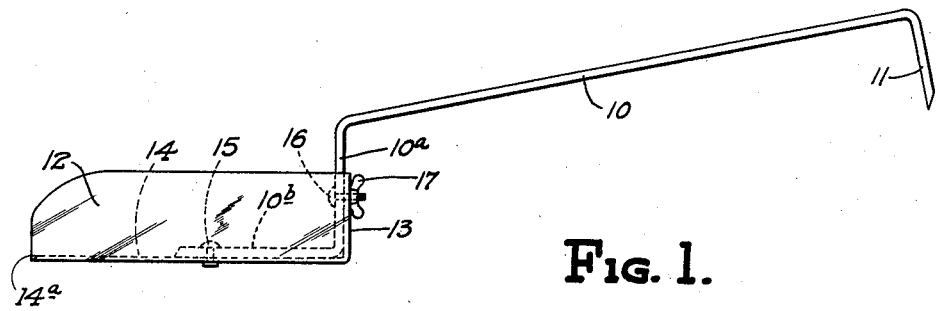
Figure 2:
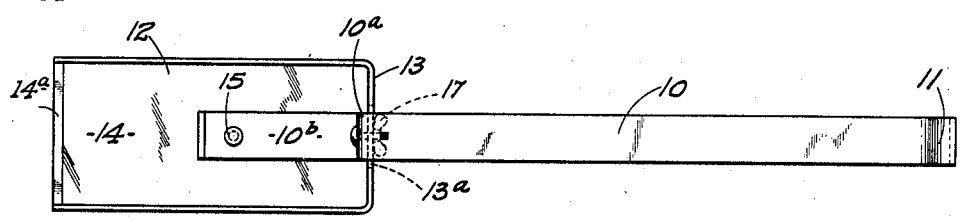
Figure 3:
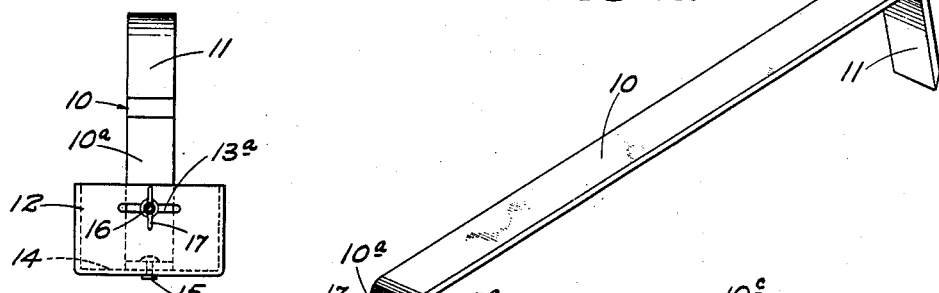
Figure 4:
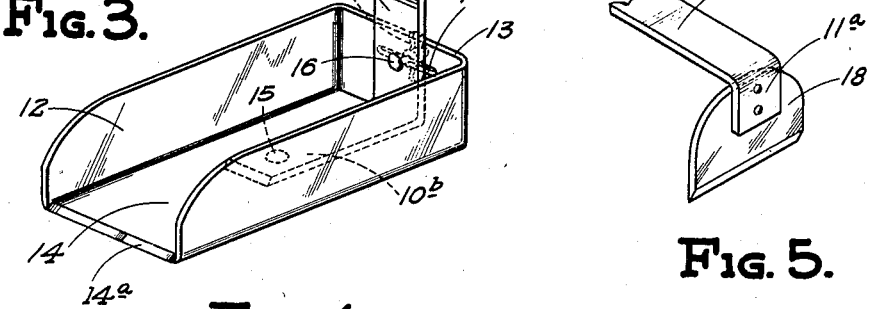

I accomplish the foregoing general object, as well as further objects which will be pointed out hereinafter, in and through the construction and arrangement of parts shown in the drawing forming part hereof, wherein Fig. 1 represents a side elevation of a tool constructed in accordance with my invention; Figs. 2, 3 and 4 represent, respectively, a plan view, an end elevation, and a perspective view of the tool shown in Fig. 1; and Fig. 5 a detail showing a modification of the scraper end of the said tool.

Describing by reference characters the parts shown in the drawing, 10 denotes the handle portion of my tool, the said handle being preferably formed of flat metal of sufficient width to enable the downturned end 11 thereof to operate as a chisel or scraper for removing from the bottom of the gutter material that adheres thereto with such tightness as to prevent its removal by the scoop 12 to which the other end of the handle is attached.

As will be seen from the drawing, the portion of the handle to which the scoop is attached is provided with an extension a portion of which is bent downwardly at 10a, forming a central reinforcing connection with the back 13 of the scoop, and another portion of which is then bent forwardly, as shown at 10b, to form means whereby this portion may be secured to and within the bottom 14 of the scoop, the said bottom being beveled at its front end to form a cutting edge, as shown at 14a.

The front of the handle extension 10b is pivotally connected to the bottom 14 of the scoop, as by means of a rivet 15. The downwardly bent handle extension 10a is adjustably connected with the back 13 of the scoop by means of a short bolt 16 which extends through a slot 13a in the back or rear wall of the scoop and which has a wing nut 17 applied thereto.

The scoop is preferably made of cold-rolled steel of sufficient thickness to enable it to withstand the incidents of use, and its width is substantially equal to the inside width of the bottoms of gutters as now constructed. In practice, a scoop approximately 5" long by 2⅜" wide has been found to be suitable for use for the purpose described, with the handle and the chisel 11 approximately one inch in width.

With the parts constructed and arranged as described, the operation will be readily understood. In ordinary use, the tool will be used by placing the scoop within the gutter and by pushing the scoop therealong by means of the handle 10. When any debris within the gutter adheres to the latter too closely to permit its easy removal by the scoop, then the chisel-like scraper at the opposite end of the handle is used to loosen such debris which can then be removed by the scoop.

It happens frequently that, by reason of the location of a gutter with reference to the overhang of the roof, it is inconvenient to insert the scoop within the gutter and to operate the latter with the handle extending axially of the scoop, as shown in the drawing. In such case, the handle may be adjusted so as to render the scoop more conveniently applicable to the gutter by loosening the wing nut 17 and adjusting the relative positions of the scoop and handle by means of the bolt 16 and slot 13a. After the scoop and handle shall have been so adjusted, they may be secured in such adjusted position by setting up the wing nut.

Figure 5:
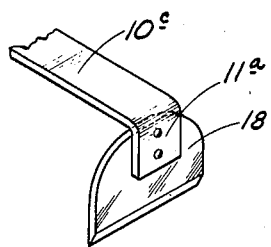

In Fig. 5 there is shown a modification of the means for loosening tightly adhering debris, such modification consisting in attaching to the downturned end 11a of the handle 10c a blade 18 of substantially the same width as that of the scoop.

For convenience of description, the part of the tool comprising the scoop and the part with the handle secured thereto will be referred to as the "front" of the tool and the "front" part of said handle, respectively, while the part of the handle to which the scraper 11 is attached will be referred to as the "rear" part.

The tool herein described is inexpensive of production, but is particularly efficient as a means for removing the debris from gutters with which buildings are equipped.

Having thus described my invention, what I claim is:

A tool of the character described comprising a scoop adapted to be received within a roof gutter and having rear, bottom and side walls, an elongated handle having its front end bent downwardly and forwardly, means pivotally securing the forwardly bent portion of the handle to the bottom of the scoop, means adjustably securing the downwardly bent portion of the handle to the rear wall of the scoop, the last mentioned means comprising a slot extending transversely of the rear wall of the scoop, a bolt extending through said slot and through the downwardly extending portion of the handle and a nut on said bolt.

FRANK W. THOMAS.